United States Patent [19]

Ina et al.

[11] Patent Number: 4,494,157

[45] Date of Patent: Jan. 15, 1985

[54] INFORMATION READOUT APPARATUS

[75] Inventors: Kenzo Ina; Teruya Hara, both of Yokohama, Japan

[73] Assignee: Canon Kabushiki Kaisha, Tokyo, Japan

[21] Appl. No.: 405,568

[22] Filed: Aug. 5, 1982

[30] Foreign Application Priority Data

Aug. 21, 1981 [JP] Japan ................................ 56-130205

[51] Int. Cl.³ ............................................. G11B 5/09
[52] U.S. Cl. ......................................... 360/48; 360/49
[58] Field of Search .................... 360/50, 48, 49, 72.2

[56] References Cited

U.S. PATENT DOCUMENTS

| | | | |
|---|---|---|---|
| 3,208,057 | 9/1965 | Applequist et al. | 360/72.2 |
| 3,546,686 | 12/1970 | McPherson et al. | 360/49 |
| 3,797,037 | 3/1974 | Kolpek | 360/722 |

Primary Examiner—Vincent P. Canney
Attorney, Agent, or Firm—Fitzpatrick, Cella, Harper & Scinto

[57] ABSTRACT

An information readout apparatus reduces an effective wait time and shortens access time when information recorded on a magnetic disc is read out by effectively utilizing a wait time of a disc rotation. When a sector on the magnetic disc on which a magnetic head is currently positioned is between a start address and an end address, information behind the current sector is buffered and the sequence of the buffered information is rearranged as required and read out so that overlapped readout of the previously read information from the magnetic disc is prevented to shorten the access time. The current sector address is compared with the start address and the end address to process the information.

5 Claims, 7 Drawing Figures

INFORMATION READOUT APPARATUS

BACKGROUND OF THE INVENTION

1. Field of the Invention

The present invention relates to a magnetic disc readout apparatus which shortens access time by reading out information recorded on a magnetic disc with shorter wait time.

2. Description of the Prior Art

In the prior art, when a disc storage is to be accessed, data transfer has to be delayed until a desired disc address appears. That is, a wait time for disc rotation is necessary. A modern disc storage provides a high disc rotational speed and hence has a short process time. The time required for one revolution of the disc is 16–20 milliseconds (ms) and one half of the one revolution time of the disc, that is, 8–10 milliseconds, is added as a mean wait time of the disc rotation to the disc process time. Thus, the wait time for the disc rotation, which is a physical wait time, is on the order of $10^{-3}$ second. This is a very large time loss when compared with an electronic process time of on the order of $10^{-6}$ second.

SUMMARY OF THE INVENTION

It is a first object of the present invention to shorten access time by reducing the wait time for rotation of a magnetic disc.

It is a second object of the present invention to shorten access time by accessing from an intermediate point of a sector on the magnetic disc.

DETAILED DESCRIPTION OF THE PREFERRED EMBODIMENTS

Figure 1:
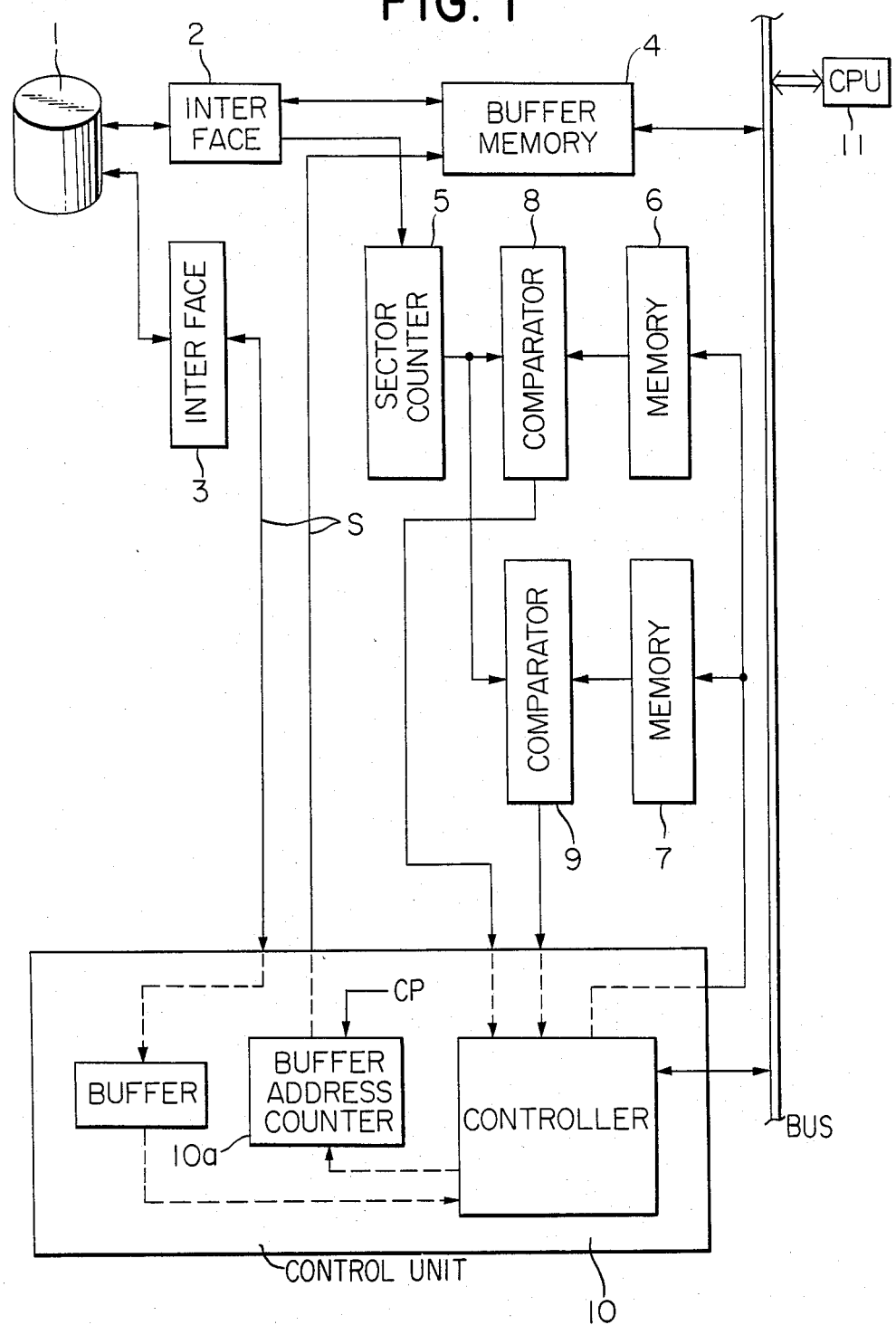
FIG. 1 shows a block diagram of one embodiment of an information readout apparatus of the present invention.

Referring to FIG. 1, numeral 1 denotes a disc storage, numeral 2 denotes a timing signal circuit for the disc storage 1 and an interface for reading and writing data, numeral 3 denotes an interface for decoding physical addresses of the disc storage 1, read/write gates and disc status, numeral 4 denotes a buffer memory for temporarily storing read/write data of the disc storage 1, numeral 5 denotes a sector counter for counting bus point signals or sector/index pulses generated by the disc storage 1, numeral 6 denotes a memory for temporarily storing a start address of the disc storage 1 requested by a higher order unit, numeral 7 denotes a memory for temporarily storing an end address of the disc storage 1 requested by the higher order unit, numeral 8 denotes a comparator for comparing the contents of the sector counter 5 and the memory 6, numeral 9 denotes a comparator for comparing the contents of the sector counter 5 and the memory 7, and numeral 10 denotes a control unit which detects start and end of access to the disc storage 1 by decoding an instruction from the higher order unit (CPU 11) or signals from the comparators 8 and 9 to control the access to the disc storage 1 through the interface 3. The operation of FIG. 1 will be described later in conjunction with FIGS. 4 and 5.

Figure 2:
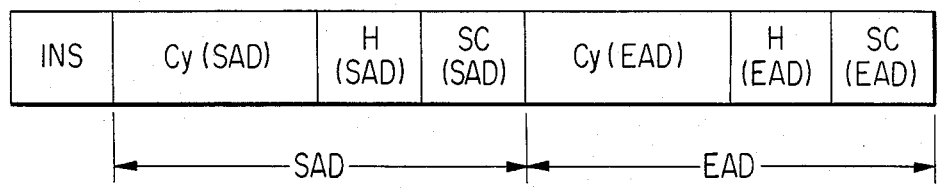
FIG. 2 shows an instruction information format.

FIG. 2 shows a format of instruction information transferred from the higher order unit to the disc storage. An INS field is an instruction field in which a read/write instruction is stored. A SAD field is a physical start address field for indicating a start address of a data access to the disc storage 1, and an EAD field is an end address field for indicating an end address of the data access.

Figure 3:
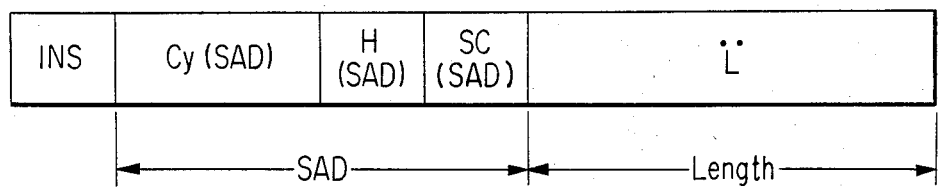
FIG. 3 shows another format.

A format shown in FIG. 3 may be used in place of the instruction information format shown in FIG. 2. In FIG. 3, instead of the end address field EAD, a data transfer length is stored in an L field as instruction information. The control unit 10 calculates a datum corresponding to the EAD based on L and SAD.

In FIGS. 2 and 3, Cy (SAD) represents a track address in the SAD, H (SAD) represents head selection information and SC (SAD) represents a start sector address in the SAD.

Figure 4:
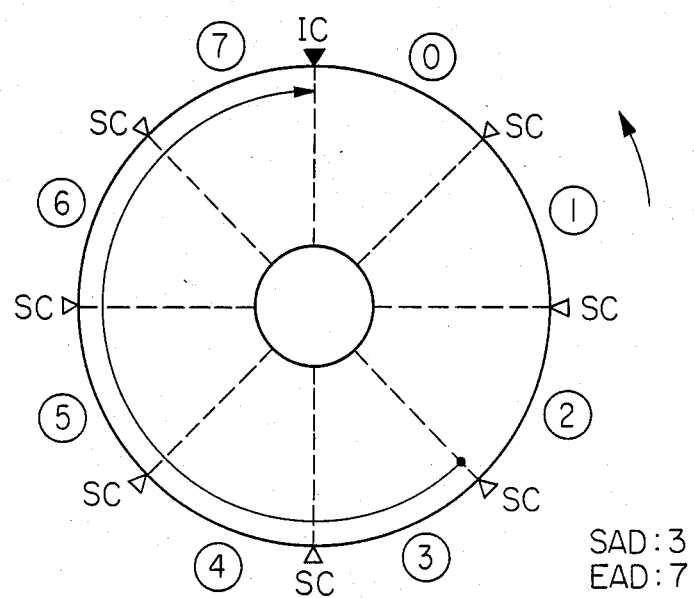
FIG. 4 shows an arrangement of sectors of a magnetic disc.
Figure 5:
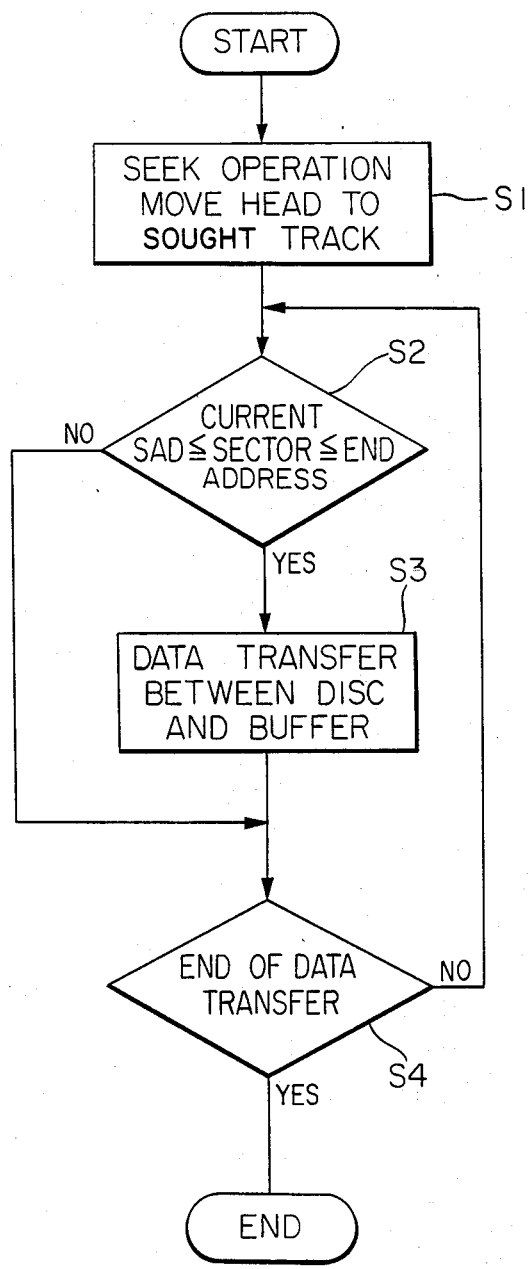
FIG. 5 shows a control flow chart for reading information.

An application of the present invention to a disc storage having eight sectors #0-#7 as shown in FIG. 4 is explained in detail with reference to the block diagram of FIG. 1 and a flow chart of FIG. 5. In FIG. 4, IC denotes an index clock which indicates a reference point in a revolution of the disc and SC denotes a sector clock which indicates a reference point in each sector.

Let us assume that an instruction requesting access to the sectors #3-#7 is issued from the higher order unit to the control unit 10 of FIG. 1. In this instruction, SAD is "3" and EAD is "7".

Let us assume that a magnetic head has reached a desired track in a seeking operation (step S1 in FIG. 5) and the head is positioned at the sector #5 which is intermediate the required sector range. In the prior art, in such a case, a wait time lasts until the sector #3 is reached, that is, during the disc rotation time for the sectors #5-#7 and the sectors #0-#2, and the sectors #3-#7 are accessed after ⅜ revolution of the disc. Consequently, a long process time is required. In the present invention, the control unit 10 stores "3" in the memory 6 and stores "7" in the memory 7. Then, as the sector #5 is detected, the control unit 10 determines that the current sector address (#5) is between the sector address #3 and the sector address #7 ($3 \leq 5 \leq 7$) and determines that it is in the address range to be accessed and carries out the access to the sectors #5-#7. Thus, the read/write gate of the interface 3 is controlled by the control unit 10 to transfer the data between the disc storage 1 and the buffer memory 4 (step S3). In a step S4, it is checked if the data transfer has been completed, and if the decision is NO, the process returns to the step S2. The sector count (content of the sector counter 5) is advanced to "6" and the data is transferred between the disc storage 1 and the buffer memory 4. When the sector count is next advanced to "7", the same process is repeated. If the sector count is "0"–"2", it is not in the requested address range and hence the decision in the step S2 is NO and the process goes to the step S4. When the sector #3 is positioned beneath the head, the access thereto is carried out, and when the sector #4 is positioned beneath the head, the access thereto is also carried out, that is, the data is transferred. When the sector #4 is reached, the end of data transfer is detected in the step S4 and the process goes to END so that the subsequent data are not read in duplicate.

Figure 6A:
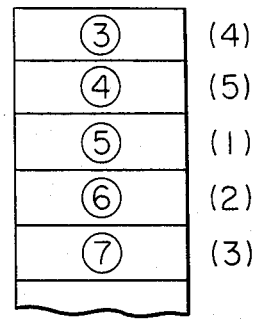
FIGS. 6A and 6B show a portion of a buffer memory corresponding to a sector and an access sequence thereto.

Thus, in accordance with the present invention, the access is started if the current sector address is in the address range to be accessed, without waiting for the start address of the data access, and the sectors #5–#7 are not read in duplicate. Accordingly, the process time can be shortened. If it is necessary to process the data in the sequence of access, that is, from the sector #3 to the sector #7, the addressing to the buffer memory 4 is sequenced as shown in FIG. 6A through a signal line S. More particularly, the data from the disc storage 1 are stored in the buffer memory 4 in the sequence of (1)–(5) so that the data are stored first in first areas (1)–(3) and then in second areas (4) and (5). Thereafter, the data are read in the sequence of 3 – 7 first from the second areas and then from the first areas. Then, the end of the data transfer between the buffer memory 4 and the disc storage 1 is reported to the CPU 11. Thus, the higher order unit sees as if the data were accessed in the sequence of sectors #3 to #7. In other words, the access to the areas 3 – 7 of the buffer memory 4 corresponding to the sectors #3–#7 to be accessed is carried out in the sequence of (1)–(5) on the right hand of FIG. 6A. This access sequence can be attained by controlling a buffer address counter 10a in the control unit 10 of FIG. 1. The buffer address counter 10a can address all areas of the buffer memory 4 and it addresses the disc sectors as shown in FIG. 6B.

Figure 6B:
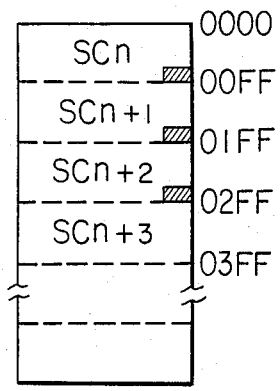

In FIG. 6B, if SCn+1 is the first area, the control unit 10 sets "0100" to the buffer address counter 10a so that the data read from the disc storage 1 is stored in SCn+1 of the buffer memory 4.

As described hereinabove, according to the present invention, the lost time in accessing the disc storage is minimized and a disc control apparatus having a faster access time is provided.

What we claim is:

1. An information readout apparatus operable with a magnetic disc having a plurality of sectors, comprising:
   means for reading data from the magnetic disc;
   memory means for storing data read from the magnetic disc; and
   control means for writing the data read from the magnetic disc in said memory means in a predetermined sequence when a current sector being read from said magnetic disc is between a start address and an end address thereon, and for reading the written data from said memory means in a different sequence from the writing sequence as required.

2. An information readout apparatus operable with a magnetic disc having a plurality of sector addresses, comprising:
   means for reading data from the magnetic disc;
   memory means for storing data read from the magnetic disc;
   count means for detecting a current sector address being read from said magnetic disc;
   address memory means for storing a start sector address and an end sector address on said magnetic disc;
   compare means for comparing the current sector address detected by said count means with the start and end sector addresses stored in said address memory means; and
   control means for writing the data read from said magnetic disc in said memory means in a predetermined sequence when said compare means determines that the current sector address is between the start sector address and the end sector address, and for reading the written data from said memory means in a different sequence from the writing sequence as required.

3. An information readout apparatus according to claim 2, wherein said address memory means includes a first address memory for storing the start sector address and a second address memory for storing the end sector address, and said compare means includes a first comparator for comparing the content from said count means with the content of said first address memory and a second comparator for comparing the content of said count means with the content of said second address memory.

4. An information readout apparatus operable with a record medium having a pluralilty of sectors, comprising:
   memory means for storing only a predetermined data group from a plurality of said sectors of said record medium from among data alternately read from record areas on which said predetermined data group is recorded on said record medium and non-record areas on which said predetermined data group is not recorded on said record medium; and
   control means for writing an intermediate-to-end portion of said predetermined data group in a first area of said memory means and a start-to-intermediate portion of said predetermined data group in a second area of said memory means, and for reading said second area of said memory means first and said first area of said memory means next.

5. An information readout apparatus according to claim 4, further comprising:
   means for checking if the read data belongs to said record areas and checking if all of the data in said predetermined data group have been read to provide a detection signal to said control means.

* * * * *